Oct. 20, 1970 C. A. GRENCI 3,534,587
HYDROSTATIC NECK SEAL
Filed Aug. 1, 1968 3 Sheets-Sheet 1

INVENTOR.
CARL A. GRENCI
BY Hinderstein & Silber
ATTORNEYS

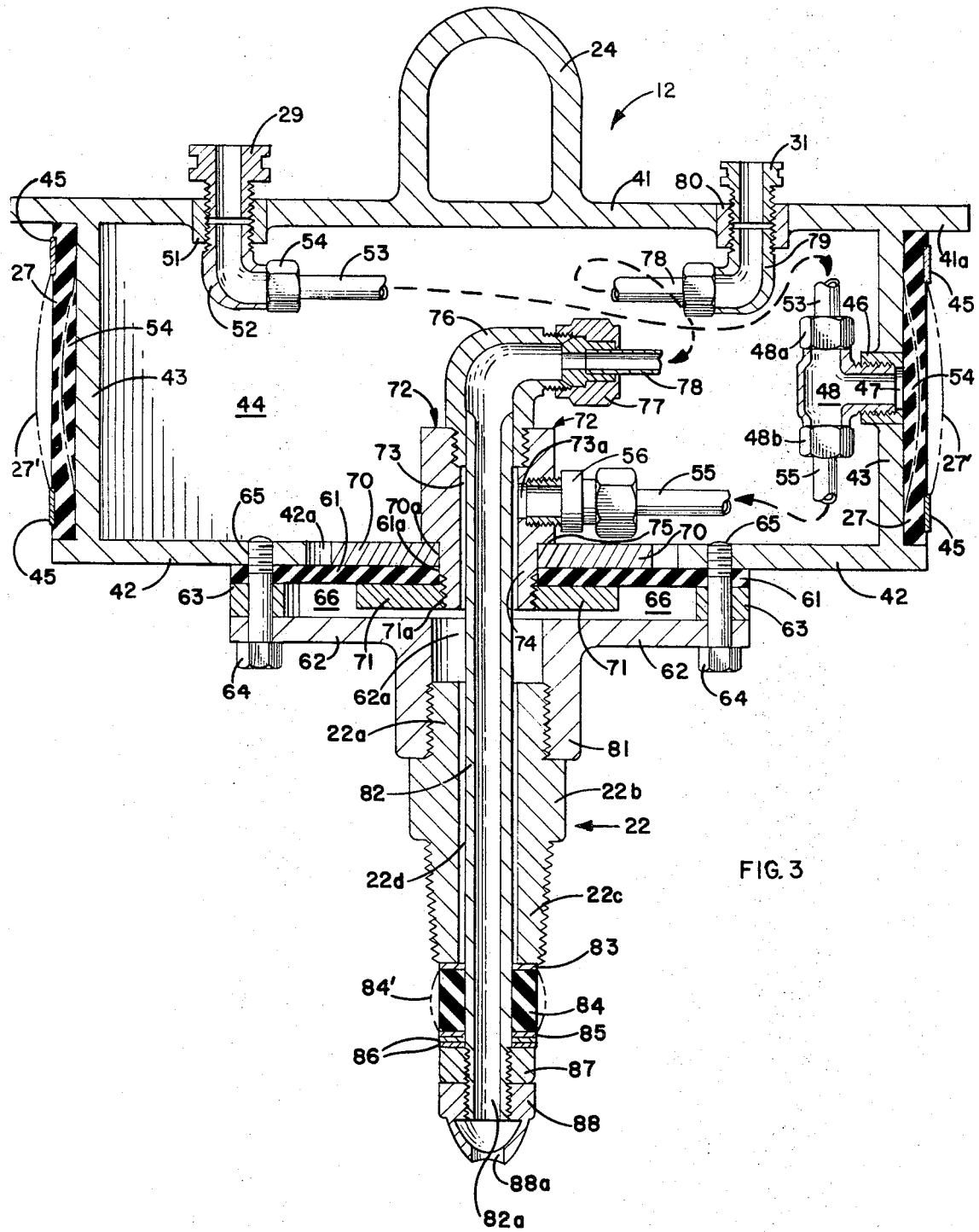

United States Patent Office 3,534,587
Patented Oct. 20, 1970

3,534,587
HYDROSTATIC NECK SEAL
Carl A. Grenci, 4791 Lesa Place,
Yorba Linda, Calif. 92686
Filed Aug. 1, 1968, Ser. No. 749,378
Int. Cl. G01n 3/10
U.S. Cl. 73—49.8
17 Claims

ABSTRACT OF THE DISCLOSURE

A neck seal adapted for incorporation in the water jacket head of an apparatus for hydrostatically testing compressed gas cylinders. The seal comprises a hydrostatic chamber having an extensible diaphragm to which is attached an elongate tube. The tube extends through a spud depending from the chamber and adapted for threaded engagement with a gas cylinder neck. An expansible grommet surrounds the tube adjacent the spud. A fitting attached to the tube compresses the grommet against the spud as the tube is moved longitudinally by displacement of the diaphragm. The resultant outward expansion of the grommet against the threaded cylinder neck results in a high pressure seal.

BACKGROUND OF THE INVENTION

Field of the invention

The present invention relates to a hydrostatic high pressure seal and, more particularly, to a hydrostatic neck seal capable of withstanding high pressure and useful in the testing of compressed gas cylinders.

Description of the prior art

High pressure steel cylinders conventionally are used to contain compressed gases for a wide variety of medical and industrial uses. Literally thousands of such compressed gas cylinders are in use daily to contain under pressure oxygen, nitrogen, hydrogen, argon and other gases. To minimize the possibility of rupture of such cylinders, with the associated dangers of explosion and/or loss of combustible or poisonous gas, periodic, expansion testing to determine the plastic and elastic deformation of the cylinders normally is carried out.

In accordance with U.S. Interstate Commerce Commission regulations, compressed gas cylinders used in interstate commerce must be checked once every five years by subjecting the cylinder to an internal pressure one and two-thirds times the working or rated pressure of the cylinder. Conventionally, this testing is carried out hydrostatically by placing the cylinder in a water-filled jacket connected to a burette. High pressure water is introduced into the cylinder, the pressure being raised to the requisite one and two-thirds times the nominal pressure of the cylinder. Total expansion (plastic deformation) of the cylinder then is measured by noting on the burette the amount of water displaced from the jacket as a result of the cylinder expansion.

To measure permanent expansion (plastic deformation) and percentage permanent expansion, the internal cylinder pressure is released. If the cylinder returns to its original shape, the burette will return to its zero position. If the cylinder does not return to within 10% of its original shape, as indicated by the burette reading, the cylinder is considered defective. Such a cylinder could rupture when subjected subsequently to severe shock or stress while filled with high pressure compressed gas.

To carry out such hydrostatic testing of compressed gas cylinders it is necessary to remove the normal gas valve from the cylinder and replace it with a sealing spud through which is introduced the high pressure test water.

In the past, to prevent leakage of the high pressure water between the sealing spud and the neck of the cylinder it was necessary to tighten the spud excessively. Typically, use of a four foot wrench or a power driven torquing machine was required to achieve a sufficiently leakproof metal to metal seal. The resulting joint between the hardened steel spud and cylinder neck often was so tight that it was difficult to remove the spud subsequent to the test. Moreover, such wrenching was excessively time consuming.

An alternative approach of the prior art to reduce torquing was to provide a thread sealing compound between spud and neck. This approach was disadvantageous because the compound had some tendency to extrude and leak under the high pressure, and more important, required time for application.

Still another approach of the prior art was to utilize an O-ring seal between the neck of the cylinder and the spud. While this approach reduced the torquing requirements, it suffered various other shortcomings. First, the top of the cylinder had to be very smooth, which was seldom the case with cylinders in daily use. As a result, it often was necessary to use a power grinder to smooth the cylinder neck prior to initiation of the test. This added an extra step to the test process and was hazardous, because the grinding had to be done at shoulder height, with the even present danger that a spark could ignite residual flammable gas in the cylinder. Moreover, the cylinder neck surfaces tended to extrude or cut the O-rings, requiring constant O-ring replacement. Further, worn threads and the high pressures to which the O-rings were subjected tended to result in leaks through the seal, voiding the test.

A further problem encountered in the prior art was how conveniently to seal the water jacket lid or head. Often complicated lid structures having multiple clamps to hold them rigidly atop the jacket were required. Such arrangements were unsatisfactory in that often they permitted air and/or water leakage from the jacket. More important, such prior art water jacket head arrangements were time consuming to connect and disconnect. In facilities where many cylinders had to be tested, the operations of attaching the sealing spud and sealing the lid on the test jacket consumed more time than the actual expansion test itself.

To overcome these and other shortcomings of the prior art, the present invention provides a hydrostatic neck seal adapted for incorporation in a water jacket head. The invention permits a high-pressure neck seal to be made to a gas cylinder without the necessity for using torquing machines, sealing compounds or O-rings. The water jacket head itself includes a novel hydrostatic seal permitting the head to be connected to the jacket rapidly and without the use of mechanical clamps. The invention thus permits significant reduction in the time required to carry out hydrostatic testing of compressed gas cylinders.

SUMMARY OF THE INVENTION

In accordance with the present invention there is provided a hydrostatic neck seal capable of withstanding high pressure. In a preferred embodiment, the neck seal is incorporated in the head of a water jacket conventionally used in the hydrostatic testing of compressed gas cylinders.

The inventive neck seal comprises a hydrostatic chamber the lower surface of which comprises a circular metal plate. The upper surface chamber comprises an extensible diaphragm of rubber or the like, the central region of which is sandwiched between a pair of rigid discs of smaller diameter than the diaphragm. A thick walled cylindrical adapter is attached coaxially to the diaphragm and discs. An elongate tube having an outer diameter less than the inner diameter of the adapter is attached coaxially within the adapter and extends downwardly through a central hole in the chamber lower plate, and through an axial opening in a sealing spud depending from the lower plate. The tube is free to move longitudinally in response to transverse displacement of the extensible diaphragm.

An expansible grommet surrounds a portion of the tube extending beyond the spud, one side of the grommet abutting against the lower threaded end of the spud. A nut or like annular fitting is fixedly attached to the tube adjacent the other side of the grommet. With this arrangement, when water or other fluid is introduced into the hydrostatic chamber, the resultant longitudinal motion imparted to the tube by motion of the diaphragm forces the fitting to squeeze the grommet against the end of the spud, causing the grommet to expand radially. When the spud is threadingly inserted in the neck of a compressed gas cylinder, expansion of the grommet forms a high pressure seal in the cylinder neck.

Sealing water to operate the inventive hydrostatic neck seal may be introduced into the hydrostatic chamber via the space between the inner wall of the cylindrical adapter and the outer wall of the tube extending within the cylinder.

Appropriate fluid connections are provided to permit, e.g., high pressure water required for hydrostatic expansion testing to be introduced into a compressed gas cylinder via the seal.

The water jacket head itself may comprise an upper circular metal plate spaced by means of a metal cylinder from a lower annular metal plate, the inventive hydrostatic neck seal being attached to the latter member. A continuous rubber sleeve surrounds the metal cylinder, attached thereto by a pair of punch locked metal bands. By introducing water or like fluid into the space between the sleeve and cylinder, the sleeve is caused to expand, e.g., against the inner wall of a cylindrical water jacket, thereby providing a hydrostatic seal.

A water jacket test head incorporating the inventive neck seal readily may be threadingly inserted in the neck of a standard compressed gas cylinder using hand force only. When the cylinder and head then are lowered into a water jacket, water provided to the neck seal hydrostatic chamber and the region between the rubber sleeve and cylinder wall accomplishes simultaneous sealing of the head to the water jacket, and high pressure sealing of the cylinder neck. Control of this sealing water may be accomplished remotely from the water jacket, as at an appropriate control console.

Of course, the inventive neck seal need not be incorporated in a water jacket test head. In simple embodiment, the seal comprises a hydrostatic chamber having an extensible diaphragm as one side thereof, an elongate member extending from the diaphragm and adapted for longitudinal motion in response to displacement of the diaphragm, an expansible grommet surrounding a portion of the elongate member, and means for compressing the grommet in response to longitudinal motion of the elongate member.

Thus it is a principle object of the present invention to provide a hydrostatic neck seal.

Another object of the present invention is to provide a neck seal capable of withstanding high pressure and adapted for use in the hydrostatic testing of compressed gas cylinders.

It is another object of the present invention to provide a seal comprising a grommet surrounding an elongate member, the grommet being expansible in response to hydrostatically imparted longitudinally motion of the elongate member.

Yet another object of the present invention is to provide an improved sealing spud apparatus for a compressed gas cylinder.

It is yet another object of the present invention to provide a device incorporating a spud threadingly engagable in a compressed gas cylinder and having associated therewith a hydrostatic neck seal capable of withstanding high pressure.

It is still another object of the present invention to provide a seal comprising a hydrostatic chamber having an extensible diaphragm as part thereof, an elongate member extending coaxially from the diaphragm and adapted for longitudinal motion in response to displacement of the diaphragm, an expansible grommet surrounding a portion of the member, and means for expanding the grommet in response to hydrostatically imparted displacement of the diaphragm.

Another obect of the present invention is to provide a hydrostatic neck seal for a vessel, the seal capable of withstanding high pressure and providing fluid communication with the interior of the vessel.

Still another object of the present invention is to provide an improved head for a water tacke conventionally used in the hydrostatic testing of compressed gas cylinders.

A further object of the present invention is to provide a water jacket head incorporating a hydrostatic neck seal.

It is a further object of the present invention to provide a water jacket head incorporating a hydrostatic neck seal and a hydrostatic head-to-jacket seal.

Another object of the present invention is to provide a head for a water jacket, the head incorporating a hydrostatic neck seal or a compressed gas cylinder, the seal being adapted to permit high pressure fluid communication with the cylinder interior.

Yet another object of the present invention is to provide a hydrostatic head-to-jacket seal for the lid of a water jacket used for expansion testing of compressed gas cylinders and the like.

A further object of the present invention is to provide an improved apparatus for the hydrostatic testing of compressed gas cylinders.

BRIEF DESCRIPTION OF THE DRAWINGS

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

FIG. 3 is a sectional view of a water jacket head incorporating the inventive hydrostatic neck seal, as seen generally along the line 3—3 of FIG. 1; for clarity the head is shown unattached to a compressed gas cylinder.

DESCRIPTION OF THE PREFERRED EMBODIMENT

Figure 1:
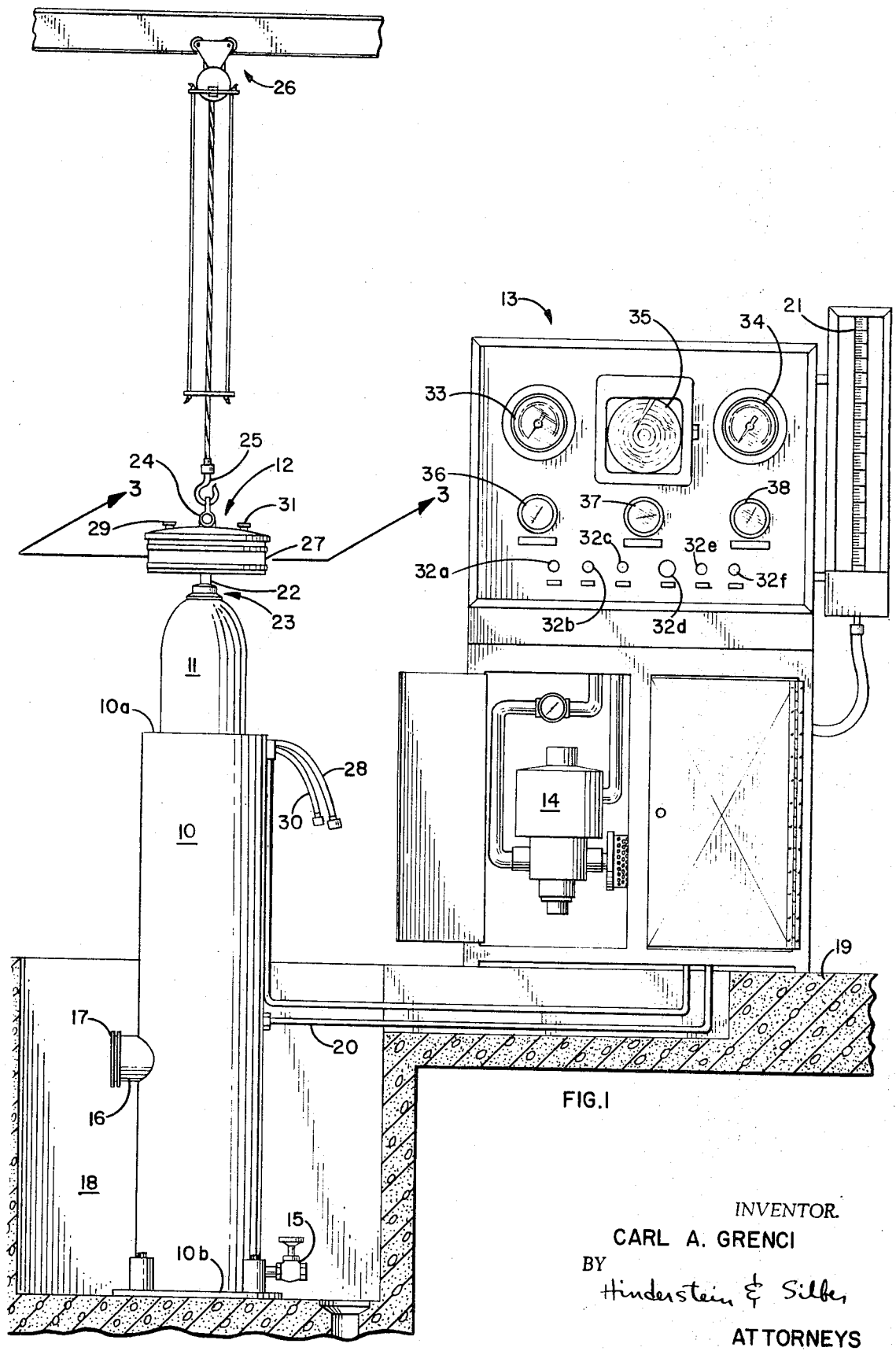
FIG. 1 is a front view of an apparatus for hydrostatically testing compressed gas cylinders, the apparatus including a control console, a water jacket and a water jacket head incorporating the inventive hydrostatic neck seal.

Referring now to the drawings and more particularly to FIG. 1 thereof, there is shown an apparatus for hydrostatically testing compressed gas cylinders. The test apparatus comprises a water jacket 10 into which is placed a compressed gas cylinder 11 to be tested. A water jacket head 12 provides a leak-proof for jacket 10. As will be described hereinbelow, head 12 incorporates the inventive hydrostatic neck seal by means of which high pressure water is prevented from escaping from cylinder 11. The test apparatus also comprises a console 13 housing a high pressure hydraulic pump 14 and various burettes, gauges and controls useful for carrying out high pressure testing of cylinder 11.

Referring still to FIG. 1, cylindrical water jacket 10 is fabricated of steel or like material having sufficient strength so as not to be effected by expansion changes of the cylinder under test. Jacket 10 has an open upper end 10a and a closed lower end 10b adjacent which is situated a drain valve 15. An explosive port 16 attached to jacket 10 is provided with a conventional blow-out disc 17 adapted to rupture should excessive pressure be encountered by jacket 10. In a typical installation, jacket 10 may be mounted in a concrete well 18 of sufficient depth so that blow-out disc 17 is situated below the level of the floor 19. A water line 20 interconnects the interior of test jacket 10 with a burette 21 mounted on control console 13.

Centrally extending from the underside of water jacket head 12 (see FIG. 1) is a sealing spud 22 which threadingly engages the internally threaded neck 23 of compressed gas cylinder 11. Head 12 is provided with a lift eye 24 for engagement by the hook 25 of an appropriate overhead crane 26. This arrangement permits crane 26 to be used to insert and remove cylinder 11 from within water jacket 10. Jacket head 12 is provided with a circumferential rubber sleeve 27 which is hydrostatically compressed against the inner surface of jacket 10 to effect an air- and water-tight seal therebetween.

High pressure water from pump 14 (see FIG. 1) is supplied to hose 28 which is adapted for attachment to a connector 29 on head 12. As will be described hereinbelow, connector 29 communicates via spud 22 with the interior of cylinder 11, thereby providing a conduit for introducing high pressure water into cylinder 11. The inventive hydrostatic seal incorporated in head 12 prevents leakage of this high pressure water into jacket 10. Sealing water, supplied from console 13 via a hose 30 adapted for attachment to a connector 31 on head 12, provides hydrostatic pressure both for the inventive neck seal and for expansion of sleeve 27.

As illustrated in FIG. 1, console 13 comprises various controls 32a–32f for operating the test apparatus. For example, knob 32a controls the flow of sealing water to head 12. Knob 32b controls the flow of water (via a line not shown in FIG. 1) into the interior of the test jacket 10. Control 32c adjusts the pressure of water supplied by pump 14 to the interior of cylinder 11. The pressure of this high pressure water is indicated by one of a pair of gauges 33 and 34 and also may be recorded by a conventional ink stylus recorder 35. Typically, gauge 33 may have a range of 0–5000 p.s.i., while gauge 34 may have a different range (e.g., 0–1500 p.s.i.). Another gauge 36 indicates the pressure of the sealing water. Other gauges 37 and 38 may be used to measure, e.g., air pressure to pump 14 if the latter is of the air driven variety.

Figure 2:
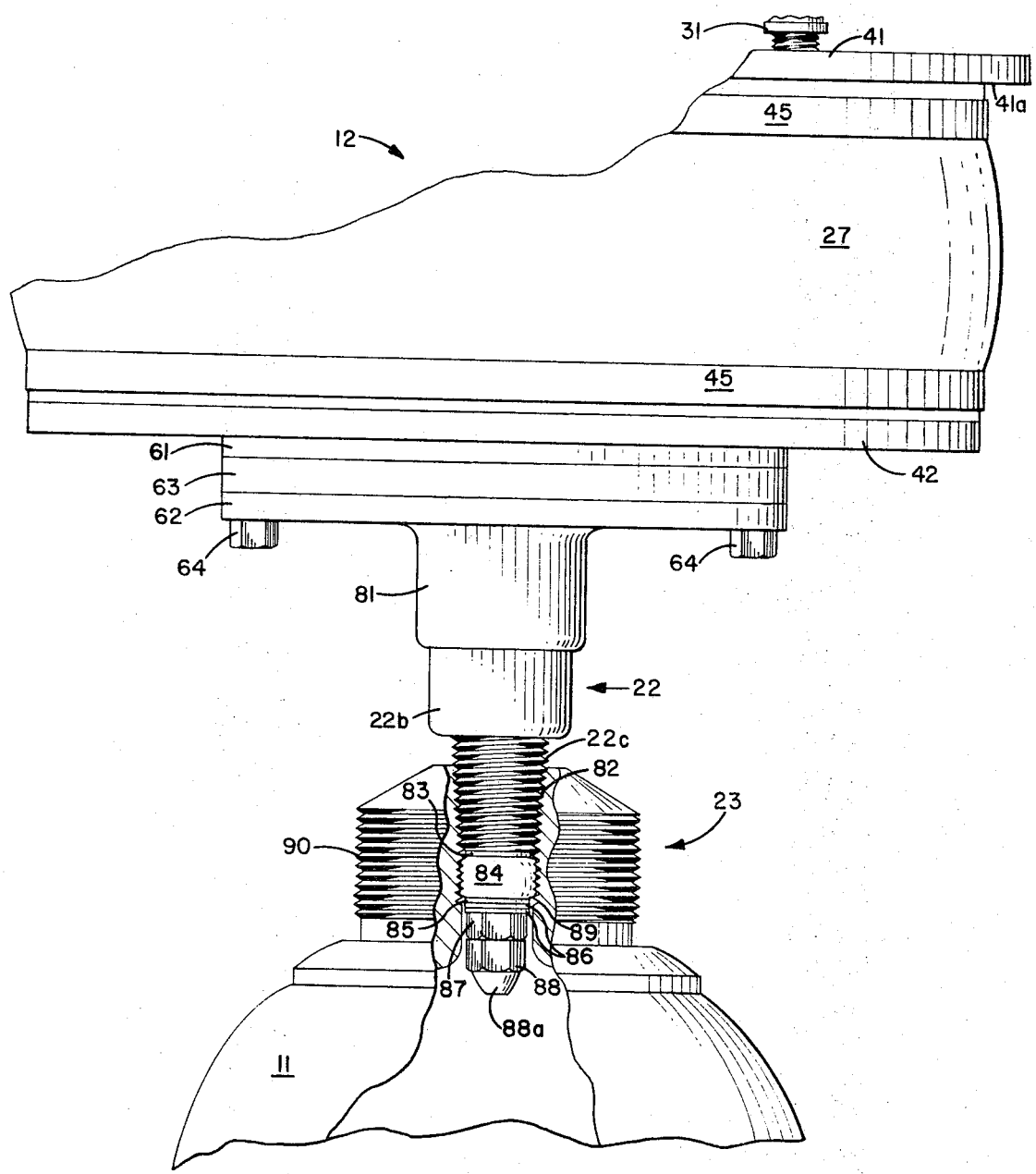
FIG. 2 is a front plan view, partially in section, of a water jacket head (as also illustrated in FIG. 1) incorporating the inventive hydrostatic neck seal; the seal is shown in operational configuration inserted in the threaded neck of a compressed gas cylinder.

Details of water jacket head 12 incorporating the inventive hydrostatic neck seal best may be understood in conjunction with FIGS. 2 and 3. As shown therein, head 12 comprises an upper disc-shaped steel plate 41 to the center of which is welded lift eye 24. Preferably, the diameter of upper plate 41 is equal to or greater than the outer diameter of water jacket 10 (see FIG. 1). Head 12 also comprises a lower steel plate 42 of annular shape, having an outer diameter slightly smaller than the inner diameter of water jacket 10. Lower plate 42 is attached in spaced parallel relation with upper plate 41 by means of a steel cylinder 43 having an outer diameter slightly less than that of lower plate 42. Upper and lower plates 41 and 42 and cylinder 43 together define an interior chamber 44.

Sleeve 27 of rubber or similar expansable material completely surrounds the exterior surface of cylinder 43. Sleeve 27 is retained in place by a pair of circumferential steel bands 45. Attached to the interior of cylinder wall 43 is an internally threaded coupling or boss 46 which communicates with the space between rubber sleeve 27 and wall 43 by means of an opening 47. A conventional male branch tee 48 threadingly engages coupling 46.

Still referring to FIGS. 2 and 3, it may be seen that a first internally threaded coupling 51 extends through upper plate 41. A conventional quick-disconnect union threadingly engages coupling 51 to form sealing water connection 29. A male elbow 52 threadingly engages the other end of coupling 51, interior of chamber 44. One end of a piece of copper tubing 53 is attached by means of a connector 54 to elbow 52. The other end of tubing 53 is attached to a branch 48a of T 48. It will thus be appreciated that sealing water entrant through connection 29 will be directed via tubing 53 to the region 54 between cylinder wall 43 and rubber sleeve 27, thereby extending sleeve 27 to the position indicated in phantom at 27' in FIG. 3.

Another piece of copper tubing 55, coiled so as to provide flexibility, connects the other branch 48b to T 48 to a male coupling 56. As will be described in detail hereinbelow, tubing 55 and coupling 56 supply sealing water to the inventive hydrostatic neck seal.

Details of the inventive hydrostatic neck seal also are evident in FIGS. 2 and 3. As seen therein, the central opening 42a in annular lower plate 42 is covered by an extensible diaphragm 61 of rubber or like material. A disc-shaped metal spud plate 62 of diameter substantially equal to that of diaphragm 61 and having a central opening 62a is maintained in spaced parallel relation with diaphragm 61 by a metallic spacing ring 63. A plurality of circumferentially spaced hex head cap screws 64 extend respectively through spud plate 62, spacing ring 63, and diaphragm 61, the screws threadingly engaging appropriately located holes 65 in lower plate 42. It will be appreciated that diaphragm 61, spacing ring 63 and spud plate 62 together define a hydrostatic chamber 66.

The middle of rubber diaphragm 61 is sandwiched between a pair of metal disc-shaped diaphragm plates 70 and 71. Upper diaphragm plate 70 is of a diameter less than that of opening 42a in annular lower plate 42; lower diaphragm plate 71 preferably is of a diameter somewhat smaller than that of plate 70. Plates 70 and 71 and diaphragm 61 are retained in sandwiched relationship by means of an adapter 72 comprising a thickwalled cylinder having an opening 73 extending axially therethrough. Opening 73 communicates with a threaded hole 73a in adapter 72 into which hole connector 56 is inserted. An externally threaded coaxial neck portion 74 of adaptor 72 extends through axial openings 70a and 61a in upper diaphragm plate 70 and diaphragm 61 respectively, and threadingly engages an axial opening 71a in lower diaphragm plate 71. This arrangement fixedly seats a portion of upper diaphragm plate 70 (adjacent opening 70a) against the shoulder 75 of adapter 72. The arrangement also permits unitary movement of adapter 72, diaphragm plates 70 and 71, and a portion of diaphragm 62, transverse of lower plate 42.

Threadingly attached to the upper end of opening 73 through adapter 72 is a male elbow 76. Elbow 76 is attached by means of a braze seal 77 to one end of a piece of tubing 78 of stainless steel or like material. The other end of tubing 78 is attached to a male elbow 79 which threadingly engages a coupling 80 extending through upper plate 41. A quick disconnect union also threadingly engages coupling 80 and functions as high pressure connection 31. Preferably tubing 78 is of excess length and is coiled within chamber 44 so as to flex with motion of adapter 72.

Depending from spud plate 62 (see FIGS. 2 and 3), coaxial with opening 73 through adapter 72, is an internally threaded coupling 81. Coupling 81 is adapted to receive the upper threaded end 22a of unitary sealing spud 22. The central region 22b of spud 22 may be hex shaped to facilitate insertion of the spud into coupling 81 by means of a wrench or like tool. The lower end 22c of sealing spud 22 is appropriately threaded to engage the interior threads 82 (see FIG. 2) of the gas cylinder 11 undergoing test. An opening 22d extends axially through the entire length of sealing spud 22. Note that a set of sealing spuds may be provided having various size threaded regions 22c to accommodate cylinders having different internal neck diameters.

As best illustrated in FIGS. 3, one end of an elongate rigid tube 82 is brazed or otherwise fixedly attached to the end of elbow 76 inserted within opening 73. Tube 82 is of sufficient length so as to extend through the entire length of openings 73 (in adapter 72) and 22d (in spud 22) and to project somewhat beyond the lower end 22c of spud 22. Tube 82 preferably is of stainless steel or the like, of sufficient wall thickness to withstand high pressures, and is externally threaded adjacent its projecting end 82a.

The outer diameter of tube 82 is smaller than the inner diameter of either opening 73 or opening 22a. This permits sealing water entrant through tubing 55 and coupling 56 to communicate via hole 73a and opening 73 with hydrostatic chamber 66. Moreover, the smaller diameter of tube 82 permits tube 82 to move longitudinally within openings 73 and 22d, such motion being imparted by motion of adapter 72 transverse of lower plate 42.

Referring to FIGS. 2 and 3, the projecting end of tube 82 is provided with a first Teflon washer 83 having an outer diameter no greater than the minimum thread diameter of lower end 22c of spud 22. Washer 83 separates the end of sealing spud 22 from an expansible grommet 84 also disposed about tube 82. Expansible grommet 84 preferably is of rubber or like material, and of sufficient length so as to insure radial expansion (as to the position shown in phantom at 84′ in FIG. 3) when compressed longitudinally. The inner diameter of grommet 84 is appropriate to insure a tight fit about the outer perimeter of tube 82.

Expansible grommet 84 is retained in place by a second washer 85 of Teflon or like material, one or more steel washers 86, and a nut 87 which threadingly engages the lower end 82a of tube 82. Damage to end 82a which could occur if the device were carelessly inserted into cylinder 11, is prevented by an acorn nut 88 which threadingly engages the end 82a of tube 82. Acorn nut 88 includes an orifice 88a permitting communication between tube 82 and the interior of cylinder 11.

It will be appreciated that high pressure water supplied to quick-disconnect union 31 via hose 30 (see FIG. 1) will flow through elbow 79, tube 78, elbow 76, tube 82 and the orifice 88a of acorn nut 88 into cylinder 11.

As noted earlier, adapter 72, diaphragm plates 70 and 71 and a portion of extensible diaphragm 61 together are adapted for limited transverse motion with respect to lower plate 42 (see FIG. 3). Should adapter 72 move upward (toward upper plate 41) tube 82 likewise will move upward, pulling with it nuts 87 and 88. This in turn will force washers 85 and 86 against the lower end of expansible grommet 84, causing grommet 84 to expand outward to position 84′, firmly engaging the interior wall 89 of the neck 25 of gas cylinder 11 under test (see FIG. 2). Grommet 84 thus seals neck 25, preventing leakage therethrough of fluid contained within cylinder 11.

The force for moving adapter 72 upward within interior chamber 44 is provided hydrostatically by means of the sealing water entrant into water jacket head 12 by means of connection 29. As noted hereinabove, this sealing water communicates via tubes 53 and 55 into hydrostatic chamber 66 between diaphragm 61 and spud plate 62. (Some water will also be present within opening 62a, the interior threaded region of coupling 81, and axial channel 22d through sealing spud 22. However, this water will be prevented from leaking into cylinder 11 by the combined sealing effect of washer 83 and grommet 84.)

As the pressure of the sealing water is increased, considerable pressure will be exerted within hydrostatic chamber 66 on extensible diaphragm 61, displacing diaphragm 61, diaphragm plates 70 and 71 and adapter 72 upward toward upper plate 41. As described, this upward motion of adapter 72 will cause outward expansion of sealing grommet 84 to the position indicated in phantom at 84′ in FIG. 3, and into firm contact with the interior wall 89 of cylinder neck 23, as shown in FIG. 2. In a typical embodiment, the area of diaphragm 61 exposed within hydrostatic chamber 66 is such that sealing water under pressure of approximately 50 p.s.i. will exert a force against diaphragm 61 of about 900 pounds. This is more than sufficient to provide, by means of expansible grommet 84, a neck seal capable of withstanding very high hydrostatic pressures within cylinder 11.

Operation of the compressed gas cylinder testing apparatus incorporating the inventive hydrostatic seal now should be apparent. Initially, the valve protection cap (not shown) is removed from external threads 90 surrounding the neck 23 of cylinder 11 (see FIG. 2) and the conventional compressed gas control valve (not shown) removed from the interior threads 82 of cylinder 11.

Water jacket head 12 then is connected to cylinder 11 by threadingly inserting the lower end of sealing spud 22 into cylinder neck 25. Of course, an appropriate sealing spud 22 is used having a lower threaded region 22c corresponding to the internal threading 82 of cylinder 11. Sealing spud 22 need not be tightened excessively onto cylinder 11, hand tightening being sufficient; the high pressure seal between head 12 and cylinder 11 is provided by the inventive hydrostatic neck seal, and not by the engagement of spud 22 with internal cylinder threads 82.

Next, as best shown in FIG. 1, overhead crane 26 is hooked to lift eye 24 and used to raise head 12 and cylinder 11 into position over test jacket 10. Spud 22, despite being only hand tight, provides sufficient threaded engagement with neck 25 to permit cylinder 11 to be raised by head 12. Cylinder 11 then is lowered until completely situated within test jacket 10. When so lowered, rubber sleeve 27 of head 12 seats within the upper end of test jacket 10, head 12 being supported by the projecting lip 41a of upper plate 41. The entrance of head 12 into jacket 10 displaces water previously placed in jacket 10. This displacement precludes entrapment of air that could affect test results and eliminates the need for venting of the test jacket, as required in prior art units. If desired, crane 26 then may be disconnected from eye 24.

Using control knob 32a (see FIG. 1) on console 13, sealing water is provided via hose 28 to connect 29 on head 12. The pressure of the sealing water is monitored by gauge 36 and typically may be in the order of 50 p.s.i. As described hereinabove, some of the sealing water entrant into head 12 (see FIGS. 2 and 3) fills the space 54 between rubber sleeve 27 and cylinder wall 43, causing sleeve 27 to bow outward against the inner surface of test jacket 10. This provides a hydrostatic head seal which is both airtight and capable of withstanding the water pressure present within test jacket 10.

The sealing water entrant into head 12 also fills hydrostatic chamber 66, forcing extensible diaphragm 61, diaphragm plates 70 and 71, adapter 72 and tube 82 upward toward plate 41. This upward motion is imparted to nuts 87 and 88 at lower tube end 82a, in turn forcing washers 85 and 86 against expansible grommet 84. Grommet 84 bows outward against the interior 89 of cylinder neck 25, forming a high pressure seal. The resultant neck seal is not only airtight, but of sufficient strength as to prevent leakage of the very high pressure water to which the interior of cylinder 11 is subjected during test. Note that the water jacket head seal and the cylinder neck seal are accomplished by remote control from console 13.

Next, test jacket 10 has water added under control of knob 32b to raise the water level to the zero mark of burette 21. This position of burette 21 then is adjusted, if required, to set the zero point for the cylinder expansion test.

Under control of knob 32c (see FIG. 1), pump 14 is used to provide high pressure water to coupling 31 on head 12. As noted earlier, coupling 31 communicates via tube 82 with the interior of cylinder 11. Thus, the high pressure water provided by pump 14 is introduced into the interior of the cylinder 11 under test. Pressure of the water within cylinder 11 is monitored by gauge 33 and recorder 35, and is increased until the desired test pressure is reached. If a test in accordance with present day U.S. Interstate Commerce Commission regulations is being carried out, cylinder 11 must be subjected to a test pressure one and two-thirds times the nominal pressure rating of the cylinder. As earlier noted, the inventive hydrostatic neck seal prevents leakage of the high pressure water from within cylinder 11. In fact, as the water pressure within cylinder 11 increases, increasing pressure is exerted on grommet 84, tending to improve its sealing effectiveness.

Under the force of the high pressure water, cylinder 11 will tend to expand or bow outward, this expansion displacing water within test jacket 10. The displaced water is prevented from escaping from test jacket 10 by means of head 10 incorporating the hydrostatic head seal including extensible sleeve 27; the displaced water can only escape via water line 20 to burette 21. Thus, burette 21 directly measures the water displacement within test jacket 10 and hence provides a direct indication of the expansion or elastic deformation of cylinder 11 when internally subjected to high pressure.

Permanent expansion and percentage permanent expansion of the cylinder under test then are measured by reducing the pressure of, or bleeding the water from within cylinder 11 and noting the new reading of burette 21. For example, should burette 21 return to the test zero position, this would indicate no permanent expansion or plastic deformation of cylinder 11.

On occasion, cylinder 11 may rupture when subjected to the high hydrostatic test pressure. As a safety feature, blowout disc 17 is adapted to burst should such rupture of cylinder 11 occur. In this instance, the water within test jacket 10 and ruptured cylinder 11 will flood out via explosion port 16, flooding well 18. This safety action prevents the otherwise dangerous possibility of secondary rupture of test jacket 10 itself.

The test is completed by reducing the sealing water pressure to head 12 so as to permit rubber sleeve 27 to return to its relaxed position. This also reduces the pressure within hydrostatic chamber 66 (see FIG. 2) sufficiently so that diaphragms 61, 70 and 71 and adapter 72 will return to their rest position, thereby relieving the compressive force exerted against sealing grommet 84 and permitting grommet 84 to return to its relaxed state. Subsequently, the sealing water and high pressure water hoses may be disconnected from connectors 29 and 31 respectively, and crane 26 again used to remove water jacket test head 12 and cylinder 11 from test jacket 10. The test is completed by unscrewing head 12 from cylinder 11; again no wrenches are required since spud 22 was inserted into cylinder neck 25 with only hand force.

While a particular configuration of the inventive neck seal has been described in detail hereinabove, it will be appreciated that the invention is of broader scope. Thus the seal may be seen to comprise a hydrostatic chamber having an extensible diaphragm as one side thereof, an elongate member appropriately connected to the diaphragm so as to be moved in response to displacement of the diaphragm, a sealing grommet surrounding a portion of the elongate member, a rigid component maintaining one side of the grommet positionally fixed with respect to the non-flexible portion of the hydrostatic chamber, and an element attached to the elongate member to compress the other side of the grommet as the elongate member moves.

While the inventive hydrostatic neck seal has been described hereinabove as incorporated in a water jacket head used for the hydostatic testing of compressed gas cylinders, use of the inventive neck seal is by no means so limited. Thus, the inventive hydrostatic seal may be used in other applications where it is necessary to provide a seal for a vessel of any configuration, the seal being capable of withstanding extremely high pressures within the vessel. The seal may incorporate a high pressure channel communicating to the vessel interior, or (as e.g., by replacing tube 82 with a solid rod) may be adapted merely as a closure device, without additionally facilitating such high pressure communication. The inventive hydrostatic neck seal may be used independently, or in conjunction with mechanisms of any nature.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

What is claimed is:

1. A hydrostatic seal comprising, in combination:
   a hydrostatic chamber, one side of said chamber comprising an extensive diaphragm,
   an elongate member extending from said diaphragm,
   an expansible grommet surrounding said member, and
   means for causing expansion of said grommet in response to motion of said member imparted by hydrostatic extension of said diaphragm.

2. A seal as defined in claim 1 wherein said elongate member is adapted to be moved with said diaphragm and wherein said means comprises a rigid member operatively connected between said hydrostatic chamber and one side of said grommet.

3. A seal as defined in claim 2 wherein said rigid member comprises a threaded spud.

4. A seal as defined in claim 3 wherein said elongate member comprises a tube extending substantialy coaxially with said diaphragm.

5. A seal as defined in claim 4 wherein said tube extends through an axial opening in said spud, and wherein said means further comprises an annular fitting fixedly attached about said tube adjacent the other side of said grommet.

6. A device for sealing the threaded neck of a compressed gas cylinder or the like, said device comprising,
   a spud adapted for threaded engagement with said neck, said spud having an axial opening therethrough,
   a hydrostatic chamber, one surface of said chamber comprising a movable diaphragm, said spud being exteriorly attached to said chamber,
   an elongate member extending through said axial opening, said member being attached to said diaphragm,
   an expansible grommet surrounding a portion of said member, one side of said grommet abutting against said spud, and
   a fitting fixedly attached to said tube adjacent the other side of said grommet, whereby longitudinal motion of said member imparted by movement of said diaphragm causes said grommet to be compressed between a said fitting and said spud.

7. A device as defined in claim 6 wherein said chamber comprises a rigid plate disposed in spaced parallel relation with said diaphragm, said plate having a hole therethrough, said spud being attached to said plate with said axial opening aligned coaxially with said hole, said elongate member extending through said hole.

8. A device as defined in claim 7 wherein said diaphragm is circular, and further comprising adapter means for attaching an end of said elongate member to said diaphragm.

9. A device as defined in claim 8 further comprising means for introducing a fluid into said chamber.

10. A device as defined in claim 9 wherein said adapter means comprises a pair of rigid discs of smaller diameter than said diaphragm, said discs being disposed in coaxial contiguous contact respectively with the upper and lower surfaces of said diaphragm, and a substantially cylindrical member fixedly coaxially attached to said diaphragm and said discs, said end of of said elongate member being coaxially attached to said cylindrical member.

11. A device as defined in claim 9 wherein the diameter of said elongate member is less than the inner diameter of said cylindrical member, and further including means for introducing fluid into said chamber between said elongate member and the inner wall of said cylindrical member.

12. A device as defined in claim 6 wherein said elongate member comprises a tube, said device further comprising means for introducing a fluid into the interior of said cylinder via said tube.

13. A device as defined in claim 11 wherein said elongate member comprises a tube, said device further comprising means for introducing a fluid into the interior of said cylinder via said tube.

14. A device as defined in claim 12 wherein said device is incorporated in the head of a compressed gas cylinder hydrostatic test jacket.

15. A device as defined in claim 13 wherein said device is incorporated in the head of a compressed gas cylinder hydrostatic test jacket.

16. A device as defined in claim 14 wherein said head comprises upper and lower plates spaced by a rigid cylinder, said device being attached to said lower plate, said head further comprising an extensible sleeve surrounding said cylinder, and means for introducing a fluid between said sleeve and said cylinder.

17. In an apparatus for hydrostatic expansion testing of a compressed gas cylinder, said apparatus including a water jacket adapted to contain the cylinder under test and to be filled with water, that improvement comprising a water jacket head comprising:

an upper metal disc shaped plate and a lower metal annular plate maintained in spaced relationship by a metal cylinder, an extensible sleeve surrounding said cylinder, means for introducing fluid between said sleeve and said cylinder to seal said head against the inner surface of said jacket, an extensible diaphragm covering the central opening in said annular plate, a metal spud plate maintained in spaced parallel relationship below said diaphragm by an annular spacer, said spud plate having an axial hole therethrough, said spud plate, said diaphragm and said spacer together define a hydrostatic chamber, a spud depending coaxially from said spud plate, said spud having an axial opening therethrough, said spud being adapted for threading engagement with the neck of a compressed gas cylinder, a tube extending coaxially through said hydrostatic chamber, said spud plate hole and said opening, one end of said tube being connected to said diaphragm, the other end of said tube extending beyond said spud, and a fitting attached to said tube adjacent the other side of said grommet, whereby the longitudinal motion of said tube imparted by displacement of said diaphragm causes radial expansion of said grommet against the inner neck surface of said cylinder.

References Cited

UNITED STATES PATENTS

| | | | |
|---|---|---|---|
| 1,297,113 | 3/1919 | Domenico | 73—49.8 |
| 1,242,769 | 10/1917 | Chamberlain | 138—90 |
| 2,695,632 | 11/1954 | Brock | 138—90 |
| 3,247,707 | 4/1966 | Tatro | 73—49.2 |

FOREIGN PATENTS

| | | |
|---|---|---|
| 194,381 | 9/1967 | U.S.S.R. |

S. CLEMENT SWISHER, Primary Examiner